Aug. 24, 1937. C. GIRL 2,091,071
LOADING AND UNLOADING ATTACHMENT FOR AUTOMOBILES
Filed June 1, 1936 3 Sheets-Sheet 1

INVENTOR
CHRISTIAN GIRL
BY
*Whiteman, Hulbert & Belknap*
ATTORNEYS

Aug. 24, 1937.  C. GIRL  2,091,071
LOADING AND UNLOADING ATTACHMENT FOR AUTOMOBILES
Filed June 1, 1936  3 Sheets-Sheet 2
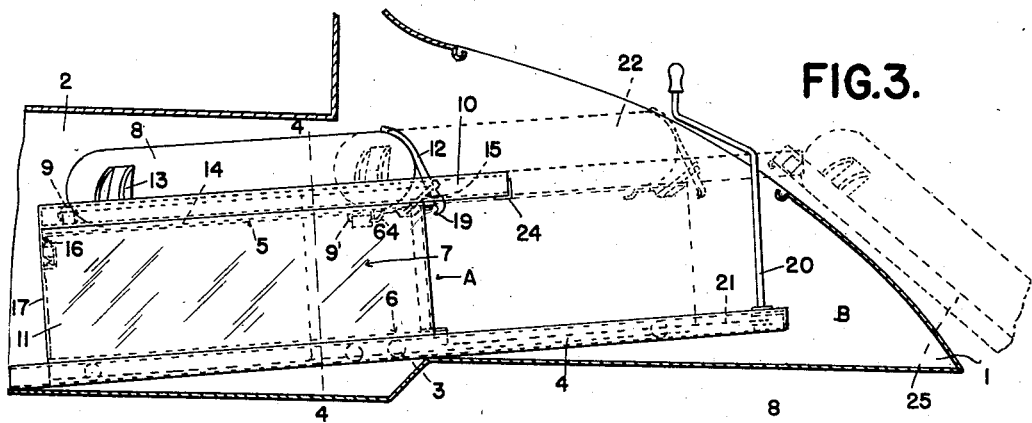
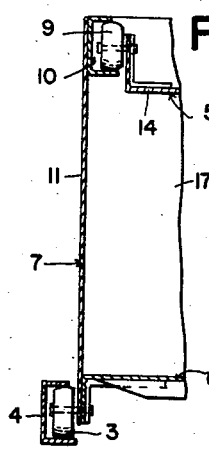
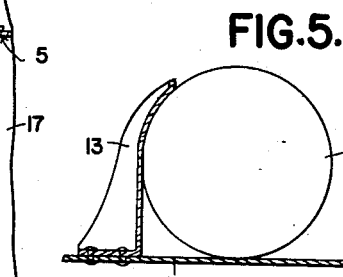
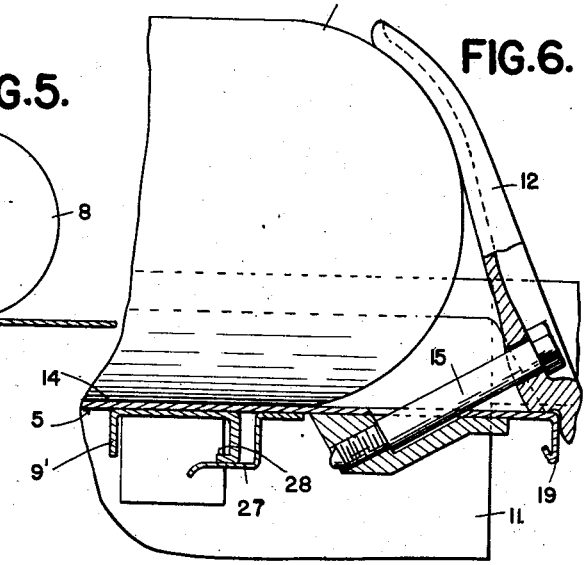
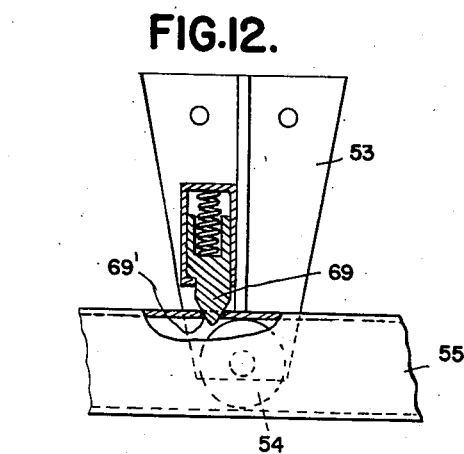
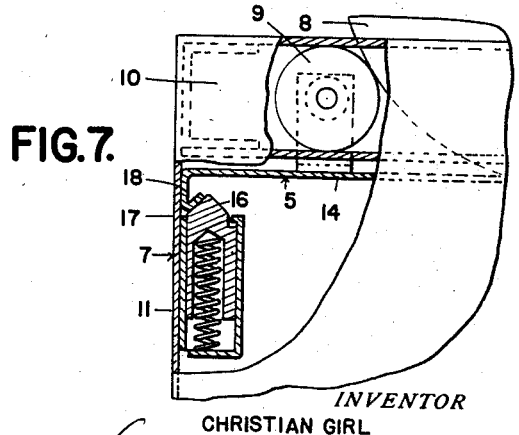
INVENTOR
CHRISTIAN GIRL
BY
ATTORNEYS Aug. 24, 1937. C. GIRL 2,091,071
LOADING AND UNLOADING ATTACHMENT FOR AUTOMOBILES
Filed June 1, 1936 3 Sheets-Sheet 3
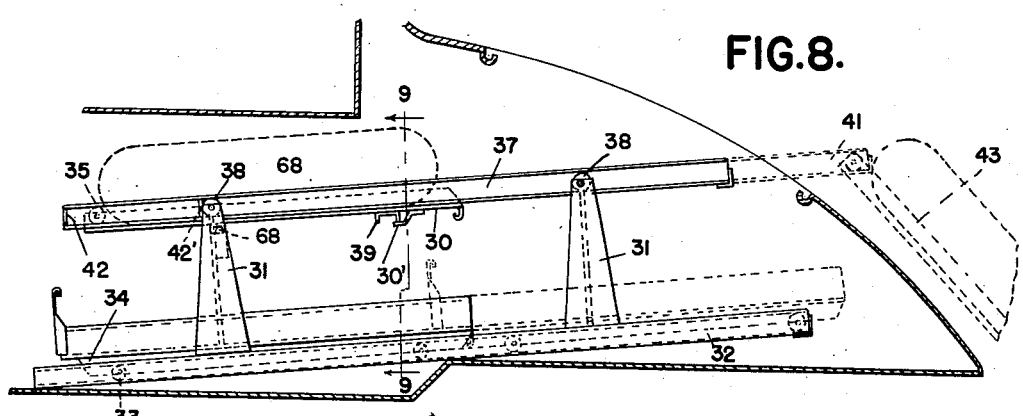
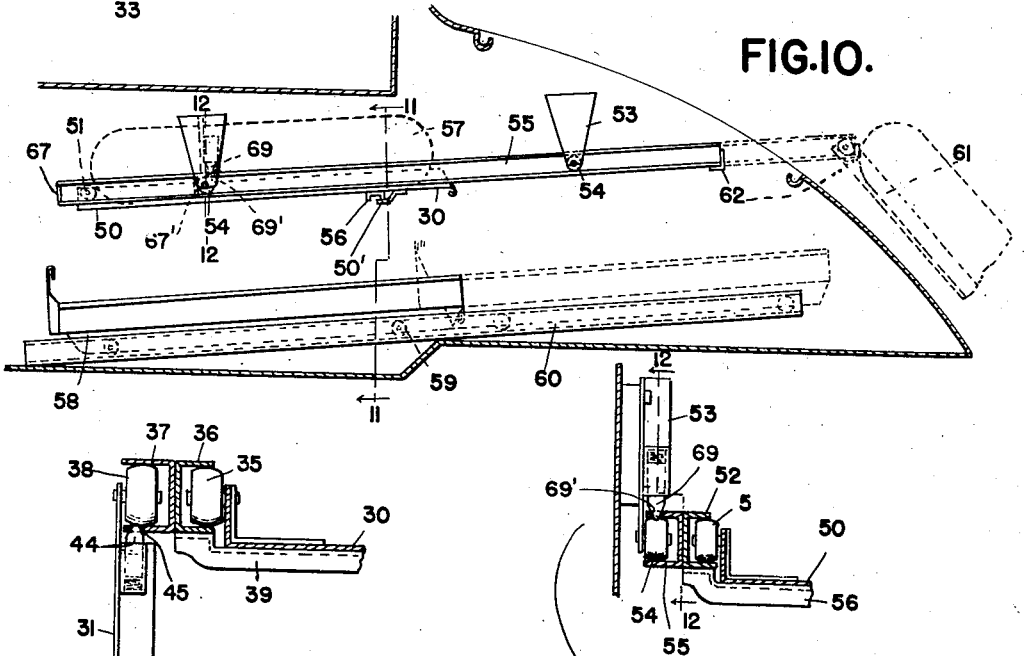
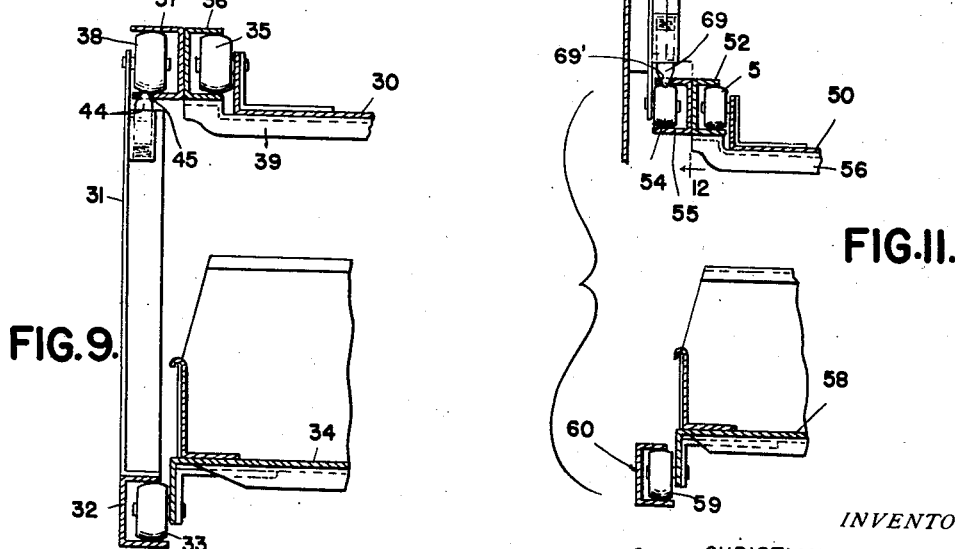
INVENTOR
CHRISTIAN GIRL
BY
ATTORNEYS Patented Aug. 24, 1937

2,091,071

UNITED STATES PATENT OFFICE 2,091,071

LOADING AND UNLOADING ATTACHMENT FOR AUTOMOBILES

Christian Girl, Detroit, Mich., assignor to Kelch Heater Company, Detroit, Mich., a corporation of Michigan Application June 1, 1936, Serial No. 82,970

21 Claims. (Cl. 214—65)

This invention relates generally to loading and unloading devices for vehicles and refers more particularly to a device for loading and unloading relatively inaccessible portions of a vehicle, such, for example, as the rear deck or storage compartment of a coupe.

One of the essential objects of the invention is to provide a new and useful device having article carrying means arranged in superposed relation and adapted to be moved to and from the inaccessible portion of the vehicle, one of said article carrying means being preferably constructed for receiving a spare wheel and/or tire, and the other of said means being adapted for the reception of miscellaneous articles.

Another object is to provide a device of this character that may be readily applied as an attachment to a vehicle.

Another object is to provide a device wherein the superposed article carrying means may be conveniently manipulated for loading and unloading purposes.

Another object is to provide a device which comprises relatively few parts and that can be manufactured and installed at a comparatively low cost.

Other objects, advantages and novel details of construction of this invention will be made more apparent as this description proceeds, especially when considered in connection with the accompanying drawings, wherein:

Figure 3 is a longitudinal sectional view through the coupe with the loading and unloading device in elevation and showing by dotted lines two positions of adjustment of the upper tire carrying tray;

Figure 4 is a fragmentary vertical sectional view taken substantially on the line 4—4 of Figure 3;

Figure 5 is a sectional view taken substantially on the line 5—5 of Figure 2;

Figure 6 is a sectional view taken substantially on the line 6—6 of Figure 2;

Figure 7 is a sectional view taken substantially on the line 7—7 of Figure 2;

Figure 8 is a view similar to Figure 3 but showing a slight modification;

Figure 9 is a sectional view taken substantially on the line 9—9 of Figure 8;

Figure 10 is a view similar to Figure 3 but showing still another modification;

Figure 11 is a vertical sectional view taken substantially on the line 11—11 of Figure 10;

Figure 12 is a vertical sectional view taken substantially on the line 12—12 of Figure 10.

Figure 1:
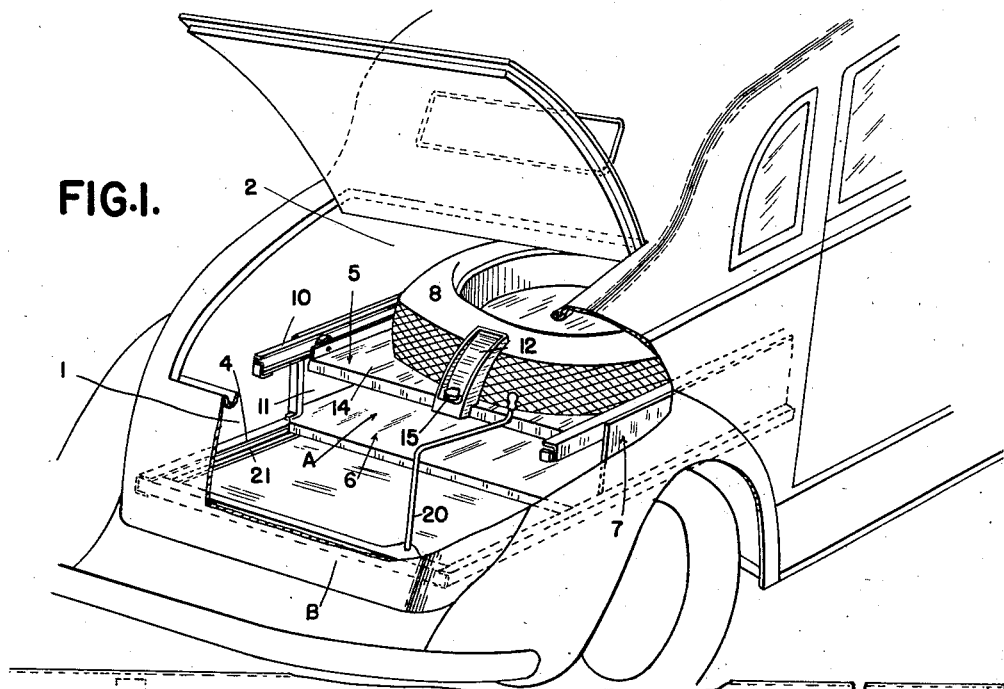
Figure 1 is a fragmentary perspective view of a coupe with parts broken away and in section, showing the rear deck lid raised and the loading and unloading device embodying my invention mounted within said deck.
Figure 2:
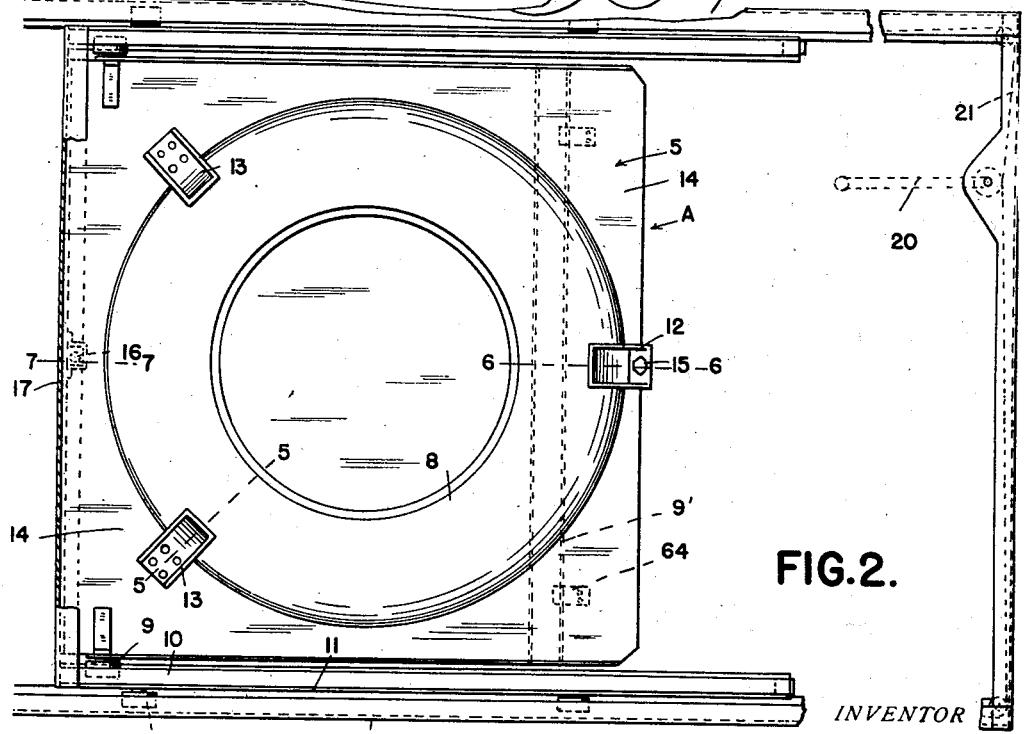
Figure 2 is a fragmentary top plan view of the loading and unloading device.

Referring now to the drawings, A is an article carrier embodying my invention within the rear deck or storage compartment B of a coupe. As shown, this carrier A is movable lengthwise of the compartment from an accessible rear end 1 to a relatively inaccessible forward end 2 of the rear deck, and for this purpose is provided at spaced points longitudinally thereof with suitable rollers 3 that travel in longitudinally extending channels 4 anchored within the deck or compartment.

Preferably the article carrier A comprises upper and lower trays 5 and 6, respectively, and an intermediate wall structure 7. The upper tray 5 is primarily adapted to carry a wheel and/or tire 8 and is provided at its forward end with suitable rollers 9 which travel in channel guides or runways 10 rigid with the upright sides 11 of the article carrier. The rear end of the tray 5 is adapted to rest upon a suitable cross bar 9' rigid with the runways 10, when the rollers 9 are in their forward position on said runways. Any suitable means such as the clamp 12 may be used for holding the wheel and/or tire 8 against suitable chocks 13 rigid with the floor 14 of the tray 5. Likewise any suitable means as the bolt 15 may be employed for holding said clamp 12 in clamping position.

Normally the upper tray 5 is held in its forward inaccessible position by means of a spring pressed detent 16 carried by the rear wall 17 of the article carrier A. As shown in Figure 7, this detent 16 engages a depending flange 18 at the forward end of the tray 5. In this connection it should also be noted that the clamp 12 also engages a depending flange 19 at the rear end of the upper tray 5.

The lower tray 6 is spaced sufficiently below the upper tray 5 to permit articles of various character to be carried between said trays. Preferably the wall structure 7 is upon the front and both sides of the article carrier A. The rear end of said article carrier is open to permit articles to be placed into or removed from said carrier.

In the present instance, the article carrier A is moved forwardly and rearwardly on the rails 4 by means of a removable crank 20 and cable 21, as, for example, in my Patent No. 2,014,019 dated September 10, 1935. However, it is apparent that various means might be employed for this purpose.

In use, the upper and lower trays 5 and 6 move in unison when the crank 20 is turned. If, for example, the article carrier A is moved from the inaccessible forward position to the accessible rear position, the trays 5 and 6 will move in unison to the rear until the tire 8 assumes the dotted position 22 in Figure 3. The upper tray 5 may then be pulled rearwardly independently of the tray 6 until the rollers 9 at the forward end of said tray 5 abut suitable angles 24 rigid with the rear ends of the runways 10. The tray 5 may then be moved downwardly to the position illustrated by dotted lines 25 in Figure 3. In this position the wheel and/or tire may be removed from the tray 5 and replaced if desired. When it is desired to return the upper tray 5 to its normal position, the said tray may be raised from the inclined dotted position 25 to a substantially horizontal position and then pushed forwardly so that the rollers 9 will travel in the runways 10 until the flange 18 becomes latched in advance of the detent 16. The rear portion of the tray 5 will then rest upon the cross bar 9' and will be held in this position by the restraining action of detent 16 and by the restraining action of spring clip 27 (shown in Figure 6) pressing against flange 28 of cross bar 9'. When the article carrier A is in its rearward accessible position, it is also apparent that miscellaneous articles may be placed on the lower tray 6 beneath the upper tray 5. Thus, the walled space between the upper and lower trays 5 and 6 constitutes in effect a storage box within the storage compartment or rear deck of the coupe.

In Figures 8 and 9 I have shown a slight modification wherein the upper tray 30 is carried by standards 31 mounted on the runways 32 for the rollers 33 carried by the lower tray 34. In this instance, the upper tray 30 is provided with rollers 35 which engage runways 36 rigid with runways 37 for the reception of rollers 38 carried by the upper ends of the standards 31. The rear portion of the tray 30 rests upon a cross bar 39 fixed to the runways 36. Thus, in this construction the upper tray 30 is wholly independent of the lower tray 34 and said trays 30 and 34 may be moved individually as desired. In this connection the lower tray 34 may be provided with a cable and crank actuating mechanism as in Figure 3 or may be moved by hand as desired. When it is desired to move the upper tray 30 from its forward inaccessible position to the rear accessible position, the runways 37 are pulled rearwardly on the rollers 38 to the dotted position 41 in Figure 8. Further rearward motion of runways 37 is prevented by brackets 42 integral with runways 37 abutting the forward rollers 38. (See the dotted position 42' of the brackets 42 in Figure 8.) The tray 30 may then be pulled rearwardly and then downwardly to the dotted position 43 in Figure 8 corresponding to the position 25 in Figure 3. The lower tray 34 may remain in its forward inaccessible position while the upper tray 30 is moved as aforesaid or the upper tray 30 may remain in its forward inaccessible position while the lower tray 34 is moved rearwardly for loading or unloading purposes. As in Figure 6, the tray 30 illustrated in Figures 8 and 9 is retained in its forward position in the runways 36 by a spring clip 30' corresponding to clip 27. Moreover, the runways 36 and 37 are held in their forward position by engagement of spring pressed detents 44 with openings or sockets 45 in the runways 37. As shown, these detents 44 are similar to the detent 16 but are carried by the forward standards 31, one on each of said standards.

In Figures 10, 11, and 12 I have shown another modification in which there is no connection whatever between the upper tray carrying means and the lower tray carrying means. They are wholly independent of one another. As shown, the upper tray 50 is provided at its forward end with rollers 51 which travel in runways 52 supported by brackets 53 rigid with the upright sides of the rear deck or storage compartment of the coupe. As shown, rollers 54 are carried by the brackets 53 and engage in runways 55 rigid with the runways 52. When the article carrier 50 is in its forward inaccessible position, it also is carried by the cross bar 56 rigid with the runways 52. As in the previous constructions described, the upper tray 50 may carry a wheel and/or tire 57. The lower tray 58 is provided with rollers 59 which travel in runways 60 rigidly mounted upon the flooring of the rear deck or storage compartment of the coupe. The lower tray 58 may be operated by a crank and cable such as in Figure 3 or may be moved by hand, as desired.

In use the lower tray 58 may be moved from its forward inaccessible position to its rearward accessible position independently of the upper tray 50 for receiving merchandise, and likewise the upper tray 50 may be moved rearwardly and thence downwardly to the inclined position indicated by dotted lines 61. In doing this, the forward rollers 51 will abut the angles 62 rigid with the rear ends of the runways 52, as in Figure 3. Then runways 52 and 55 actuated by the contact of rollers 51 with angles 62 will be moved rearwardly until angles 67, integral with runways 55, abut the forward rollers 54 as shown at the dotted position 67'. As in Figures 6 and 8, the tray 50 illustrated in Figures 10, 11, and 12 is retained in its forward position in the runways 52 by a spring clip 50' corresponding to clips 27 and 30'. The runways 52 and 55 are held in their forward position by engagement of spring pressed detents 69 with openings or sockets 69' in the runways 55. As shown, these detents 69 are similar to the detents 16 and 44 but are carried by the brackets 53, one on each of said brackets.

Thus, from the foregoing it will be readily apparent that I have provided a new and useful device for carrying spare wheels and/or tires and miscellaneous merchandise and that the means for carrying said tires and merchandise may be easily and quickly manipulated from accessible to inaccessible positions and vice versa. It is also apparent that the devices illustrated and described may be mounted upon vehicles of other types than the coupe herein shown. In each instance, when the article carriers are moved to their forward inaccessible position, the space in rear thereof within the coupe deck or storage compartment may be loaded with other articles, as desired. Moreover, in each instance the construction is such that the operator or driver of the coupe may load or unload the rear deck without having to climb or reach way in as heretofore. Since provision is made above the lower tray for carrying a tire, it is apparent that the usual tire carrying brackets and mountings therefor at the rear ends of the coupes may be dispensed with entirely. In my construction everything is self-contained within the coupe rear deck or storage compartment. Thus, a neater and more attractive vehicle is provided, and the merchandise being carried is concealed and protected from the weather.

What I claim as my invention is:

1. A vehicle loading and unloading device having runways adapted to be mounted within the rear deck of a coupe, a box-like article carrier mounted to travel along said runways, runways carried by said article carrier at the top thereof, and a tire carrier movable along the last mentioned runways from a position wholly upon said article carrier through the opening of the rear deck to a downwardly and rearwardly inclined position substantially off the last mentioned runways in rear of said deck.

2. A vehicle loading and unloading device having stationary runways, a box-like article carrier having rollers movable along said stationary runways, runways carried by opposite sides of said box-like carrier, a tire carrier having rollers movable along the last mentioned runways, and means cooperating with the tire carrier and box-like article carrier for holding the movable runways against movement.

3. A vehicle loading and unloading device having runways, a box-like article carried having rollers mounted to travel along said runways, runways carried by the upright sides of said box-like article carrier, and a tire carrier having rollers movable along the last mentioned runways.

4. A vehicle loading and unloading device having laterally spaced runways, a cross member connected to said laterally spaced runways intermediate the ends thereof, an article carrier provided at its forward end with rollers for traveling along said runways and adapted when the rollers are at a predetermined point of said runways to rest on said cross member, and means for detachably holding the article carrier on said cross member including a spring clip carried by said carrier and embracing said cross member.

5. A vehicle loading and unloading device having laterally spaced runways, a cross member connected to said laterally spaced runways intermediate the ends thereof, an article carrier provided at its forward end with rollers for traveling along said runways and adapted when the rollers are at a predetermined point of said runways to rest on said cross member, said article carrier being provided at its forward end with a depending flange, and means for detachably holding the article carrier on said cross member including a detent engageable with the depending flange at the forward end of said carrier and a spring clip at the rear end of said article carrier for embracing said cross member between said runways.

6. In a device of the class described, a set of runways, a primary article carrying tray having rollers movable along said runways, standards rising from said runways, rollers carried by said standards, a second set of runways receiving and supported on the last mentioned rollers, a third set of runways carried by the second set, and a secondary article carrying tray having rollers movable along the third set of runways.

7. In a device of the class described, a plurality of uprights, rollers carried by said uprights, a set of runways receiving and supported by said rollers, a second set of runways carried by the runways aforesaid, and an article carrying tray having rollers movable along the second set of runways.

8. In a device of the class described, a stationary support, spaced rollers carried by said support, a set of outwardly opening channel runways receiving and supported by said rollers, a set of inwardly opening channel runways carried by the runways aforesaid, and an article carrying tray having rollers movable along the second set of runways.

9. A vehicle loading and unloading device having a set of runways, an article carrier mounted to travel along said runways, rollers supported from the set of runways, a second set of runways receiving and supported by said rollers, a third set of runways connected to the second set, and an article carrier movable along the third set of runways.

10. In a device of the class described, a set of runways, a primary article carrying tray having rollers movable along said runways, standards rising from said runways, rollers carried by said standards, one to each standard, a second set of runways receiving and supported on the last mentioned rollers, a third set of runways carried by the second set, and a secondary article carrying tray movable along the third set of runways.

11. In a device of the class described, a plurality of standards, rollers carried by said standards, one to each standard, a set of channel-shaped runways receiving and supported on said rollers, an article carrier carried by said runways, and means carried by one of said standards and engageable with one of said runways for holding said runways in a predetermined position relative to said standards.

12. In a device of the class described, a set of channel-shaped runways, an article carrier having rollers movable along said runways, upright members at opposite sides of said carrier, channel-shaped runways fixed to said upright members, and an article carrier having rollers movable along the last mentioned runways relative to said side walls.

13. In a device of the class described, two vertically spaced sets of channel runways, the lower set being stationary with the channels thereof opening inwardly, and supporting means for the second set including uprights, and rollers carried by said uprights, the channels of the second set opening outwardly and receiving and supported by said rollers.

14. In a device of the class described, two vertically spaced sets of channel runways, the lower set being stationary with the channels thereof opening inwardly, supporting means for the second set including uprights, and rollers carried by said uprights, the channels of the second set opening outwardly and receiving and supported by said rollers, an article carrier having rollers movable along the channel runways of the first set, and an article carrier carried by the runways of the second set.

15. In a device of the class described, a plurality of spaced uprights, rollers carried by said uprights, one roller to each upright, channel-shaped runways receiving and supported by said rollers, runways carried by the runways just mentioned, and an article carrier movable along the last mentioned runways.

16. In a device of the class described, a plurality of spaced uprights, rollers carried by said uprights, channel-shaped runways receiving and supported by said rollers, a set of runways carried by the runways aforesaid, and an article carrier having rollers movable along the last mentioned runways.

17. In a device of the class described, a plurality of spaced uprights, rollers carried by said uprights at one end thereof, channel-shaped runways receiving and supported by said rollers, an article carrier carried by said runways, and a detent carried by one of said uprights and engageable with one of said runways to hold the latter in a predetermined position relative to said uprights.

18. A vehicle loading and unloading device having laterally spaced runways, a seat for an article carrier intermediate the ends of said runways, an article carrier provided at one end thereof with rollers for traveling along said runways and adapted when the rollers are at a predetermined point of said runways to rest on said seat, and means for detachably holding the article carrier when the rollers are at said predetermined point, including a spring clip connected to said carrier and embracing said seat.

19. A vehicle loading and unloading device having laterally spaced runways, a seat for an article carrier intermediate the ends of said runways, an article carrier provided at one end thereof with rollers for traveling along said runways and adapted when the rollers are at a predetermined point of said runways to rest on said seat, and means for detachably holding the article carrier when the rollers are at said predetermined point including a detent engageable with said carrier at the forward end thereof, and a spring clip connected to said article carrier at the rear end thereof for embracing said seat.

20. In a device of the class described, a set of inwardly opening channel runways, a primary article carrying tray having rollers movable along said runways, standards rising from said runways, rollers carried by said standards, a set of outwardly opening channel runways receiving and supported on the last mentioned rollers, a set of inwardly opening channel runways carried by the second set, and a secondary article carrying tray having rollers movable along the last mentioned set of runways.

21. A vehicle loading and unloading device having runways, an article carrier having rollers mounted to travel along said runways and having upright side walls, runways carried by the upright side walls of said article carrier, and an article carrier movable lengthwise of said upright side walls and having rollers mounted to travel along the last mentioned runways.

CHRISTIAN GIRL.